3,512,103

MULTIPLE FREQUENCY SYNTHESIZER PROVIDING A PLURALITY OF SELECTED FREQUENCIES IN A SPECTRUM OF FREQUENCIES

Leon Berman, Asnieres, France, assignor to C.I.T.-Compagnie Industrielle des Telecommunications, a French company Filed June 14, 1968, Ser. No. 737,057
Claims priority, application France, June 16, 1967, 110,793
Int. Cl. H03b *3/04, 3/08*
U.S. Cl. 331—2 5 Claims

ABSTRACT OF THE DISCLOSURE

A synthesizer for providing each of a number of radio sets with a desired frequency which may be any of a spectrum of frequencies derived from a harmonic generator connectable by controls on a frequency selector box to each of a number of frequency control boxes associated with respective radio sets and each of which can be locked to any desired frequency of the spectrum by connections which can be switched from one box to another and which connect the boxes selectively to a general control box containing the harmonic generator.

This invention relates to a frequency synthesizer designed to supply simultaneously a number of permanently synchronized and stabilized frequencies. The invention is particularly well suited, although not exclusively, to supplying a number of radio transmitter sets and/or receiver sets with stabilized frequencies.

Where a number of radio sets have to be mounted in close proximity to one another and are required to use highly stabilized frequencies which may lie within a relatively wide range, each of the radio sets may be equipped with its own frequency synthesizer. Such an arrangement is naturally expensive as a frequency synthesizer is a complex and expensive piece of apparatus which must operate as set out below.

A frequency synthesizer in its modern form comprises a variable oscillator (or several, each covering a subsidiary range of the synthesizer range) capable of conducting a process known as frequency exploration at which the frequency of its output varies in a controlled manner over the range of synthesizer frequencies. The frequency exploration process is terminated by a synchronization process which occurs when the oscillator output frequency is equal to the desired frequency. Maintenance of the synchronization process is facilitated by a phase discriminator which compares the oscillator output frequency with a high stability frequency constituting one of the components of a spectrum of harmonics of stabilized frequencies and spaced apart by a constant interval known as the "quantification step."

The moment of transition of the synthesizer oscillator from exploratory control to synchronized control is determined by a counter which is connected to the output of a beat generator and which counts the beat periods occurring in succession as the oscillator output frequency, in exploratory control, passes in turn through the stabilized harmonic frequencies. Normally, only the beat periods above a predetermined threshold frequency are counted and a logic circuit which is controlled by the counter receives an order to switch the synthesizer oscillator from exploratory control to synchronized control when the instantaneous value of the count stored in the counter is equal to a preset value set into the counter and significant of the desired frequency.

A frequency synthesizer operating as described above has the following basic units:

(A) A first unit providing a frequency selector box on which the desired frequency may be set, for example in kilocycles, by appropriate controls;

(B) A second unit containing a high stability quartz oscillator providing the fixed and stabilized harmonic frequencies making up the spectrum of harmonics exhibiting the aforesaid quantification step and covering the entire frequency range of the synthesizer. The aforesaid threshold frequency and a further "quartz" reference frequency which is necessary for the functioning of the phase discriminator are also provided by the second unit;

(C) A third unit containing a saw-tooth voltage waveform generator controlling the synthesizer oscillator output frequency during the exploratory process;

(D) A fourth unit containing the variable synthesizer oscillator (or several of these individually covering subsidiary ranges of the synthesizer frequency range) controlled by the saw-tooth voltage from the generator during the exploratory stage, and capable of being switched so as to be controlled by a fixed voltage generated from the output of the phase discriminator during the synchronization process. The fourth unit also contains modulating and filtering networks for mixing the variable frequency from the synthesizer oscillator with the spectrum of harmonics to derive a "synthesized" frequency;

(E) A fifth unit providing a phase discriminator connected to compare the aforesaid quartz reference frequency with the synthesized frequency;

(F) A sixth unit providing a counter connected to the output of the beat generator and adapted to be preset to a value significant of a frequency desired from the synthesizer;

(G) A seventh unit providing modulating and beat filtering circuits associated with the control and energization of the counter; and, (H) An eighth unit providing a logic circuit which controls switching of the synthesizer oscillator from the exploratory condition to the synchronized condition when the counter indicates that the desired frequency has been reached.

It will be appreciated that a number of sets operating in close proximity with one another may have several synthesizers functioning at the same quantification step on the spectrums of identical harmonics covering the same range but each supplying different frequencies. Such synthesizers have the same components listed above in the units B and C and these components are in exactly the same functioning state whatever the range of output frequency desired from the particular set.

In accordance with the present invention there is provided a frequency synthesizer for providing synchronized different output frequencies from respective set frequency units each of which is capable of being set by a general control unit to a desired frequency posted in a frequency selector unit; the frequency selector unit having controls to select a desired frequency and switching devices for choosing the set whose output frequency is to be synchronized with the desired frequency; the general control unit having circuitry providing a spectrum of highly stabilized frequencies with any of which the chosen set frequency unit may be synchronized, a generator providing an exploratory control voltage to a variable oscillator of the chosen set frequency unit when in exploratory control, a modulating and filtering member connected to compare the variable oscillator output frequency of the chosen set frequency unit with the frequency spectrum and providing output pulses for each coincidence of the oscillator output frequency with the spectrum frequencies lying above a predetermined threshold frequency, and a pulse counter adapted to be preset to a number indicative of the desired frequency of synchronization and to provide a switching signal to change the variable oscillator from exploratory control the synchronized control when the number of coincidence pulses received corresponds to said preset number; and each set frequency unit having in addition to the variable frequency oscillator a modulating and filtering circuit which modulates the variable oscillator output frequency with the frequency spectrum received from the general control unit to provide a first frequency, a phase discriminator comparing the first frequency with a second stabilized frequency received from the general control unit to provide a synchronizing control, and switching circuitry responsive to said switching signal from the counter of the general control unit to change the variable oscillator from exploratory control to synchronized control when its output frequency coincides with the desired frequency posted in the frequency selector unit.

The multiple frequency synthesizer of the invention has the advantage that it can be arranged to provide several sets with quantificated frequencies simultaneously and with using only a single unit A (the frequency selector box); a single group of units B (the source of stabilized frequencies); a single unit C (the saw-tooth generator used in exploratory control of the variable oscillators of the sets); a single unit F (the counter which receives the beat output and controls the change-over of the variable oscillators from exploratory control to synchronized control); and a single group of units G (the modulating and filtering circuits associated with the counter F). The number of units D (variable oscillator), E (phase discriminator) and H (logic circuit) correspond to the maximum number of frequencies the synthesizer is required to provide simultaneously.

For convenience the unit A on which the desired frequencies may be set may be located remote from the other units which are preferably arranged in groups. For example, in a ship the unit A may be located in the bridge wireless office or in a central wireless control room while the remainder of the units may be arranged in suitable compartments grouped well beneath the water line, suitable connection lines being provided for feeding the synthesized frequencies from the multiple synthesizer to the individual sets which are to be controlled by them.

The frequency selector box of unit A is preferably provided with a switch, such as a pushbutton, an index from which the operator may read the specific uses of the sets to be fed with frequencies by the synthesizer, and manual control elements which he can set to a desired frequency corresponding to a particular set selected by the operator from the index to have its frequency provided by the synthesizer. When the operator has set the desired frequency and marked on the control box the set to which it has been routed, he operates the switch and the remotely positioned synthesizer synchronizes the variable oscillator of the set with the frequency "posted" in the frequency selector control box A. When the set in question has passed from exploratory control to synchronized control a suitably positioned warning light is illuminated on the control box A and the operator can then post a second frequency to a second set. In this way each of the sets may, in turn, be provided by the operator with separate frequencies obtained from the multiple synthesizer.

It will be appreciated that the frequencies of the sets need not necessarily be set on the control unit A by the operator by hand. They may equally well be recorded in advance on perforated tape or the like and an automatic controller used to control the frequency selector unit in accordance with the information stored on the tape.

The invention will now be described in more detail, by way of examples only, with reference to the accompanying drawings, in which.

Figure 1:
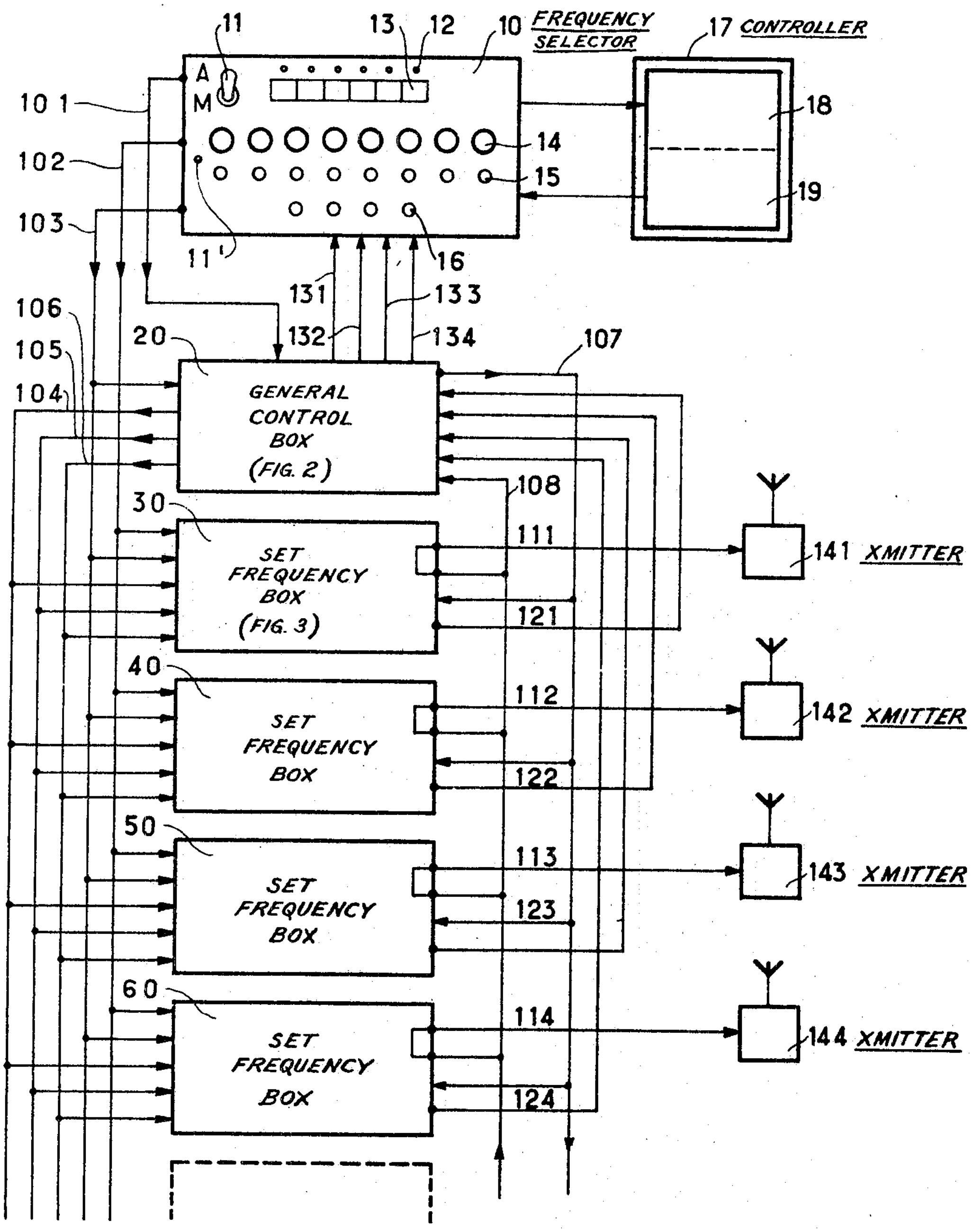
FIG. 1 is a block diagram showing interconnections between parts of a multiple synthesizer.
Figure 2:
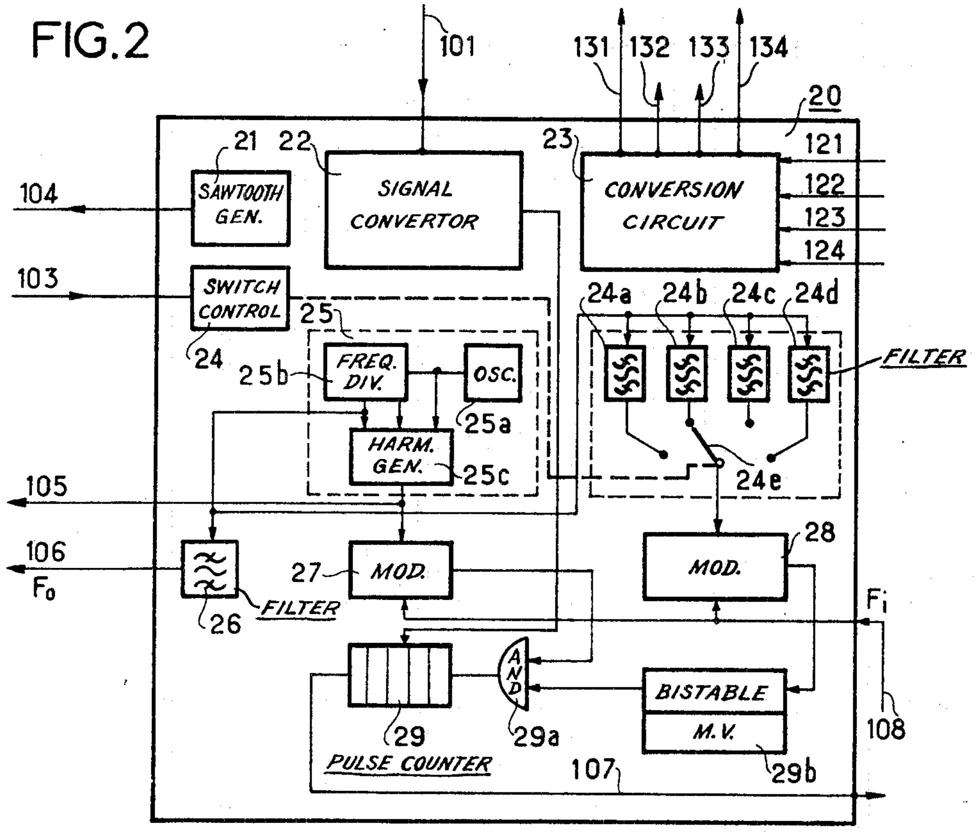
FIG. 2 is a synoptic diagram of a general control box used in FIG. 1.

Referring to FIG. 1 the multiple synthesizer comprises: a frequency selector box 10 which may be manually or automatically controlled; a controller 17 controls the box 10 when automatic control is required; a general control box 20 shown in more detail in FIG. 2 and which is brought into use each time a frequency is to be provided by the synthesizer, and four set frequency boxes 30, 40, 50 and 60, respectively associated with transmitters 141, 142, 143 and 144 and each of which sets the frequency of the transmitter to which it is individually connected. Although only four set frequency boxes are shown, a fifth is partially shown in dotted outline and it will be appreciated that any number of frequency boxes corresponding to the number of transmitters to be fed by the multiple synthesizer may be provided. In the following description it will be assumed that in fact the synthesizer is capable of providing ten different transmitters with ten frequencies, respectively.

The frequency selector box 10 is provided with a switch 11 controlling operation of the general control box 20 when a particular frequency with which one of the sets is to be synchronized is selected. A battery of six control knobs 12 and associated visual markers 13 enable the frequency selector box to be set to a particular frequency shown by the six markers 13. A line of knobs 15 are operable individually to switch the frequency indicated at 13 and hereinafter referred to as being "posted" on the frequency selector box to the various transmitters controlled by the synthesizer. Although only eight knobs 15 are shown it will be understood that there are as many knobs as there are sets. A visual indicator 14 is associated with each of the knobs 15 and lights up when the frequency posted at 13 is being fed in an synchronized state to the selected transmitter by the associated set frequency box. The connection of the selected set frequency box to the frequency selector box is effected by an engagement control knob 11′. A set of four subsidiary range knobs 16 are shown in the lower portion of the frequency selector box and each of them covers a section of the synthesized range of frequencies. The subsidiary range selection knobs 16 could be omitted in a frequency selector box in which the subsidary range selection is controlled directly by the posting assembly formed by the control knobs 12 and markers 13.

The frequency posted in the box 10 is transmitted by operation of the general switch 11, through a cable 101 which feeds into the general control box 20 information significant of the posted frequency. A second cable 102 connects the frequency selector box to each of the set frequency boxes 30, 40, 50 . . . and transmits an order for the selection of the set frequency box chosen on the frequency selector box by the switch knob 15, the information being fed into the cable 102 by the engagement control switch 11′. A third cable 103 connects the frequency selector box 10 to the general control box 20 and each of the set frequency boxes 30, 40, 50 . . . and transmits an order for subsidiary range selection determined by whichever of the range selector kobs 16 is depressed in the box 10.

The set frequency boxes are individually controlled by the general control box to find a particular frequency posted in the frequency selector box 10 and to synchronize the associated transmitter with that frequency. When synchronization has taken place the general control box 20 transmits a signal back to the frequency selector box 10 to illuminate one of the visible indicators 14 associated with the switch knob 15 of the transmitter selected. These signals which advise the operator that the transmitter set in question is now synchronized, are fed through a group of ten lines extending from the general control box 20 to the frequency selector box 10, only four of these lines being shown to avoid overburdening of the drawing and being referenced 131, 132, 133 and 134.

The general control box 20 has fed into it by line 108 a frequency $F_i$ emitted by one of the frequency boxes 30, 40, 50 . . . selected for synchronization. The general control box 20 also receives through lines 121, 122, 123, 124 signals from respective set frequency boxes 30, 40, 50 and 60 when synchronization has taken place. These signals are fed back from the general control box 20 to the frequency selector box 10 to illuminate the visible indicator 14 corresponding to the frequency box of the transmitter selected.

The general control box 20 is connected to each of the set frequency boxes 30, 40, 50 . . . by three lines 104, 105 and 106. Line 104 transmits a voltage controlling the exploration of an oscillator associated with a selected frequency box and preferably taking the form of a repetitive saw-tooth waveform. The line 105 transmits to the selected frequency box a complete spectrum of harmonics having a high stability and generated in the general control box 20. Line 106 transmits to the selected frequency box a high stability reference frequency. A further line 107 connects the general control box 20 to each of the set frequency boxes 30, 40, 50 . . . and instructs the selected frequency box to switch from exploratory control to synchronized control when the general control box 20 detects identity between the frequency posted in the selector box 10 and the output frequency of the selected frequency box in exploratory control.

Each of the set frequency boxes 30, 40, 50 . . . is connected by respective lines 111, 112, 113 and 114 to respective transmitters 141, 142, 143 and 144 and the same lines are looped through the frequency boxes to provide the output frequency $F_i$ fed through line 108 from the set frequency box in exploratory control to the general control box 20.

Turning now to FIG. 2 which shows the general control box in more detail, it will be seen to contain a generator 21 providing a saw-tooth output voltage which is fed through line 104 to control the oscillator of the selected set frequency box in exploratory control. A convertor 22 receives from the frequency selector box 10 a signal significant of the desired frequency set on the markers 13 and converts the signal into a pulse group which prefills a pulse counter 29 to a value significant of the desired frequency. The range selected by one of the knobs 16 of the frequency selector box 10 is transmitted through cable 103 to a switch controller 24 governing the position of a commutating switch shown diagrammatically as a wiper arm $24_e$ selectively movable to connect with one of four output terminals of a set of filters $24_a$, $24_b$, $24_c$ and $24_d$. The four frequencies passed by the filters $24_a$–$24_d$ provide respective threshold frequencies corresponding to the four subsidiary ranges of the synthesizer frequency range and which are individually determined by the range selector knobs 16. The four filters $24_a$–$24_d$ receive stabilized frequencies from the output of a frequency divider $25_b$ forming part of a stabilized harmonic frequency generator enclosed within a picked line and referenced 25.

The stabilized harmonic generator 25 is provided with a high stability quartz oscillator $25_a$ whose output is connected to the frequency divider $25_b$ and also to a harmonic generator device $25_c$ which produces harmonics having the desired quantification step. The spectrum of harmonics is fed from the generator 25 through the output line 105 to each of the set frequency boxes 30, 40, 50 . . . shown in FIG. 1. A narrow band filter 26 selects the reference frequency $F_o$ from the output of the frequency divider $25_b$ and feeds it through line 106 to each of the set frequency boxes 30, 40, 50 . . . .

Incoming signals from the set frequency boxes 30, 40, 50 denoting synchronization has taken place and fed through lines 121, 122, 123 . . . 124 enter a conversion circuit 23 which transmits a lamp illuminating signal on one of the group of ten lines of which four are shown at 131–134 in FIG. 1 to light the visible indicator 14 associated with the switch knob 15 selecting the set just synchronized.

The output frequency $F_i$ of the chosen set frequency box in exploratory control, is fed through lines 108 to a first modulating and filtering member 27 which receives a second input from the harmonic generator circuit $25_c$. Each time the output frequency $F_i$ beats with one of the frequencies in the output of the harmonic generator circuit $25_c$ in a particular manner, a signal is transmitted to an AND gate $29_a$. The output frequency $F_i$ fed into the control box through the line 108 is also supplied to a second modulating and filtering member 28 which receives from the commutating switch arm $24_e$ a stabilized threshold frequency from one of the filters $24_a$–$24_d$ selected by the switch controller 24 operated by the range selector knob 16 of the frequency selector box 10. The modulating and filter member 28 provides an output signal when the frequency $F_i$ beats with the chosen threshold frequency and this signal is fed into a bistable multivibrator $29_b$ which switches from a first state to a second state to provide an output signal to the AND gate $29_a$ when the output frequency $F_i$ passes through the threshold frequency determining the point at which counting of coincidences between the output frequency $F_i$ and the frequencies of the harmonic spectrum is to commence. The pulse counter 29, which has previously been set to a value corresponding to the frequency posted in the frequency selector box 10, counts the coincidences of the output frequency $F_i$ with the frequencies of the spectrum and provides a switching signal on line 107 when the number of coincidences corresponds to the number preset in the counter 29. The signal on line 107 is fed to the set frequency box providing the output frequency $F_i$ in exploratory control, and switches the set frequency box from exploratory control to synchronized control.

Figure 3:
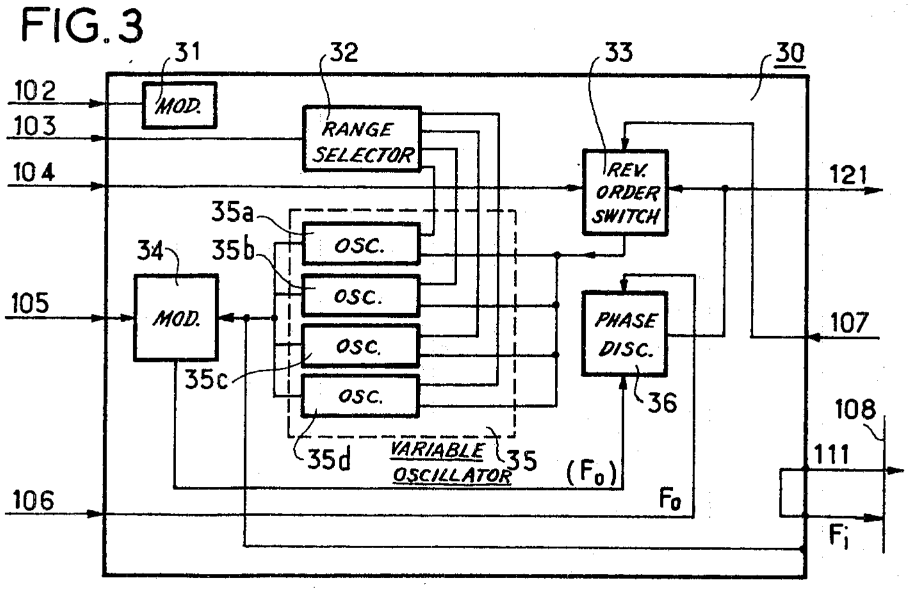
FIG. 3 is a synoptic diagram of one of the set control boxes associated with respective transmitters in FIG. 1; and, FIG. 4 is a synoptic diagram of an alternative form of multiple synthesizer to that shown in FIG. 1.

FIG. 3 shows details of the chosen set frequency box. The box, referenced 30, contains a variable frequency oscillator 35 composed of four subsidiary range oscillators $35_a$, $35_b$, $35_c$ and $35_d$. The subsidiary range oscillators are individually selected by a range selector 32 which is controlled by a signal received through cable 103 from the frequency selector box 10 of FIG. 1. The range is selected by one of the range selector knobs 16 of the box 10. The chosen subsidiary range oscillator is controlled by a reversing order switch 33 so as to be energized selectively by the saw-tooth waveform originating from the generator 21 in the general control box 20 when the exploratory process is taking place, or by a fixed frequency determined by the output of a phase discriminator 36. The condition of the reversing order switch 33 is determined by a trigger signal fed through line 107 from the general control box and which switches the reversing order switch 33 of the set frequency box between the two conditions corresponding, respectively, to the exploratory process and to the synchronized process. The stabilized voltage output from the phase discriminator 36 occurring during the synchronized process is fed back through line 121 to the convertor 23 of the general control box which sends a signal to illuminate the corresponding visible indicator in the frequency selector box 10.

The output from the variable oscillator 35 is fed to a modulating and filtering unit 34 which also receives the harmonic spectrum supplied through line 105 from the harmonic generator 25 of FIG. 2. The modulating and filtering unit 34 provides a modulated output signal which includes a frequency component equal to the difference between the output frequency of the variable oscillator 35 and each of the harmonic frequencies received through line 105 from the general control box. As the output frequency of the variable oscillator 35 varies under exploratory control, the output frequency of the modulating and filtering unit 35 changes and is continually compared by the phase discriminator 36 with the reference frequency $F_o$ obtained from the narrow band filter 26 of the general control box 20. When the reference frequency $F_o$ is equal to the nominal value ($F_o$) of the output from the modulating and filtering unit 34, the phase discriminator 36 provides a constant output signal which is fed to the input side of the reversing order switch and through lead 121 to the general control box. When the reversing order switch operates, the constant voltage is applied in place of the saw-tooth voltage to the subsidiary range oscillator formerly under exploratory control, to maintain its output frequency constant at the value at which coincidence between the reference frequency $F_o$ and the nominal frequency ($F_o$) from the unit 34 occurs.

The set frequency box additionally contains an engagement device energized through cable 102 from the frequency selector box and which responds by allowing the set frequency box 30 to be controlled by the general control box 20 if the switch knob 15 corresponding to set frequency box 30 is depressed when the engagement control 11′ of the frequency selector box is operated. The switching of the set frequency box by the general control box between the exploratory and synchronized processes is carried out by the pulse counter 29 of the general control box, as described above, when the local oscillator output of set frequency box 30 fed back to the general control box through line 108 corresponds to that at which the first modulating and filter member 27 provided an output which caused the number of counts received by the pulse counter 29 to equal its preset value determined by the convertor posting 22. The variable oscillator output of the set control box is also fed through line 111 to the transmitter 141.

The frequency synthesizer shown in FIG. 1 operates as follows.

The operator posts in the frequency selector box 10 the desired frequency for one of the transmitters, say transmitter 141 and operates the appropriate range selector knob 16 and also the knob 15 corresponding to the transmitter 141. By operating the general switch 11, the frequency selected is transferred to the general control box 20.

The operator then presses the engagement control switch 11′ which engages selectively the set frequency box 30 chosen by the corresponding knob 15.

The general control box presets the pulse counter 29 to a value corresponding to the chosen frequency and simultaneously the subsidiary range selector 32 of the set frequency box connects the appropriate subsidiary range oscillator of the variable oscillator 35 of the set frequency box shown in FIG. 3. This oscillator then receives the saw-tooth frequency voltage supplied by the generator 21 in the general control box to produce exploratory control of the variable oscillator 35.

The output frequency $F_i$ of the variable oscillator 35 is applied through lead 108 to the general control box and the number of coincidences between it and the output frequencies of the harmonic generator circuit $\mathbf{25}_c$ are stored in the pulse counter if they exceed the threshold frequency which causes the bistable multivibrator $\mathbf{29}_b$ to set the AND gate $\mathbf{29}_a$ in its openable condition. In other words, each time the changing output frequency $F_i$ of the variable oscillator 35 passes through a harmonic contained in the output of the harmonic generator $\mathbf{25}_c$, that harmonic lying above the selected threshold frequency, a pulse is received in pulse counter 29 which is of reversible type so that such pulse depletes the count stored by one.

When the pulse counter 29 steps back to zero, the variable oscillator output frequency $F_i$ at which this occurs corresponds to the desired frequency. When this occurs a pulse is sent on line 107 to the set frequency box and operates the reversing order switch 33 to transfer the voltage control of the variable oscillator from the exploratory saw-tooth waveform to the constant voltage supplied by the phase discriminator 36. The local oscillator 35 is now voltage-controlled by the phase discriminator 36 in a way which maintains synchronization. The unidirectional voltage supplied by the phase discriminator 36 is also fed back through lead 121 to the general control box which responds by illuminating the visible indicator 14 corresponding to set frequency box 30. The operator is thus informed that the frequency of the box 30 has been synchronized and he can then synchronize the next frequency box. If the visible indicator 14 goes out, the operator is warned that synchronization has been lost and can act accordingly.

The controller 17 not so far mentioned enables resynchronization of one of the output frequencies $F_i$ to take place automatically if it has been accidentally lost. The controller 17 comprises essentially a memory 18 in which is stored each of the desired frequencies $F_i$, the subsidiary range information corresponding to the range selector knob 16 requiring operating to set that frequency, and the set frequency box destined to produce that frequency. The memory 18 is connected through a logic circuit 19 which provides the frequency selector box with the necessary information. On a chosen frequency being lost by a set frequency box, the signal which results in the visible indicator 14 being extinguished automatically advises the controller 17 which responds by automatically operating the controls of the frequency selector box to repeat the exploratory and synchronization processes on the set frequency box in question.

For the sake of simplicity, the signal source which returns the bistable multivibrator $\mathbf{29}_b$ of the general control box 20 of FIG. 2 has been omitted. It will be appreciated that the bistable multivibrator $\mathbf{29}_b$ could be switched back into its first state by a suitable circuit fed from the lines 121–124 which are energized when synchronization of a particular set frequency box has been carried out.

Figure 4:
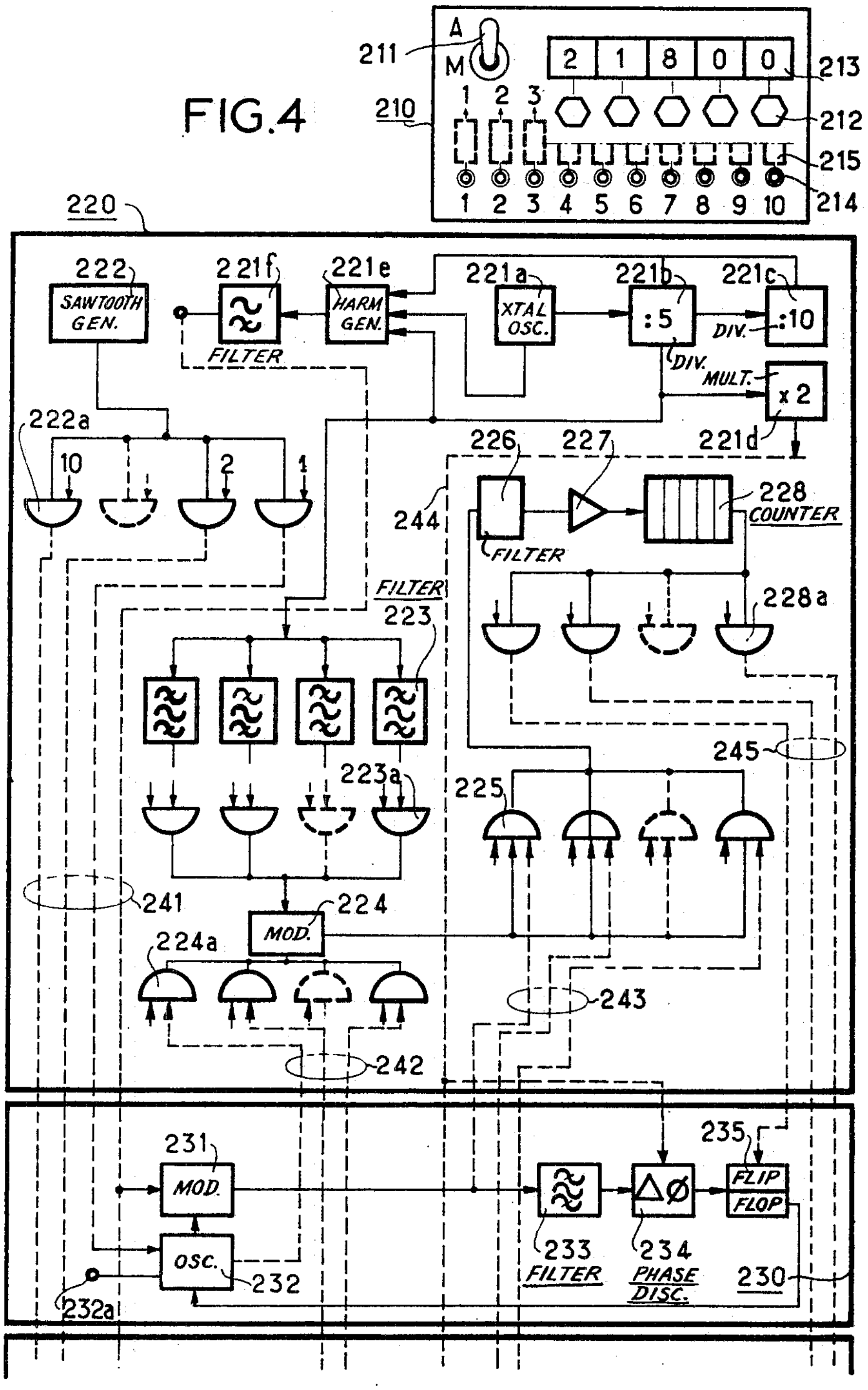

FIG. 4 shows an alternative form of frequency synthesizer in which parts corresponding in function to those previously described are similarly identified except that the reference numerals are prefixed by the number 2 so that they lie in the 200 series. The frequency synthesizer of FIG. 4 has ten set frequency boxes each of which contains only one subsidiary range oscillator 232.

The synthesizer of FIG. 4 has a frequency selector box 210 provided with a general switch 211, a frequency marker 213 on which is set, for example, the frequency 21800 kilocycles, each space of the frequency marker 213 being individually adjustable to select different frequencies by five control knobs 212. The ten transmitters to be controlled by the frequency selector box are individually selected by switch knobs 215 which appropriately bias into their unstable states respective monostable multivibrators shown diagrammatically at 214.

The synthesizer has a general control box 220 containing a stabilized frequency generator operating from a stabilized quartz oscillator $\mathbf{221}_a$ having a 5 mc./s. output frequency, a frequency divider $\mathbf{221}_b$ which divides the output of the quartz oscillator $\mathbf{221}_a$ by five, a second frequency divider $\mathbf{221}_c$ which introduces a second division of ten, a frequency multiplier $\mathbf{221}_d$ connected to the output of the first divider $\mathbf{221}_b$ and a haromic generator $\mathbf{221}_e$ providing harmonics displaced from one another by 0.1 mc./s. A band pass filter $\mathbf{221}_f$ eliminates the harmonics in the spectrum output of the generator $221_e$ beneath a predetermined threshold level. The output from the divider $221_b$ is fed to an assembly of four parallel filters 223 providing respective limiting frequencies which are distributed amongst ten AND gates of which four are shown at $223_a$. The AND gates $223_a$ have a common output lead extending to a modulator 224 which receives a second input from a starting gate forming one of ten starting gates one of which is referenced $224_a$.

The output from the modulator 224 energizes ten inputs of ten gates 225, respectively, each corresponding to a different set and which share a common output terminal connected to the input side of a low frequency filter 226 connected in series with an amplifier 227 and a counter 228 whose output is connected to respective input terminals of ten counting AND gates $228_a$.

The general control box 220 also contains a saw-tooth voltage generator 222 connected to the inputs of ten AND gates $222_a$ which are individually operated in accordance with the selection of the set frequency boxes. One of the set frequency boxes is shown at 230 from which it will be seen to contain a modulator 231, a variable oscillator 232 providing an input to the modulator 231 and capable of being switched between exploratory control and synchronized frequency control and providing an output of chosen frequency on a terminal $232_a$. A band pass filter 233 tuned to, for example, two mc./s., and connected to receive the output of the modulator 231. A phase discriminator 234 connected to the output of the band pass filter 233 and controlling operation of a bistable multivibrator 235 which is triggerable from state 1 to state 2 to provide a constant voltage to the variable oscillator 232 when synchronization has been achieved.

Connections, not shown, to prevent unnecessarily burdening the drawing, extend from the monostable multivibrator 214 of the frequency selector box to all of the groups of ten AND gates partially shown at $222_a$, $223_a$, $224_a$, 225 and $228_a$. For example, assume that control knob 215 is pressed. This biases the first multivibrator 214 into its unstable state and makes the first gate of each of the groups of ten gates capable of being triggered into its conductive condition when the other gate inputs are applied. Groups of connections 241 shown in broken line extend individually from the AND gates $222_a$ to apply the saw-tooth output of the generator 222 to the chosen set frequency boxes when in exploratory control. A further group of connections partially shown at 242 apply to the general control box the frequency of the variable oscillators 232 of the set frequency boxes during the exploratory process, these frequencies being applied to whichever of the AND gates $224_a$ are selected. Another set of connections ringed at 243 and also shown in broken line feed the output from the modulators 231 of the set frequency boxes to respective AND gates 225 of the general control box 220. An additional group of connections partially shown at 245 extend from the counting gates $228_a$ of the control box to the bistable multivibrators 235 of respective set frequency boxes, and finally a connection 244 extends from the frequency multiplier $221_d$ of the general control box to each of the phase discriminators 234 of the set frequency boxes to provide a reference voltage.

The synthesizer of FIG. 4 operates as follows.

The operator posts the desired frequency on the frequency selector box 210 by means of the control knobs 212 and the markers 213. Let us assume that this frequency of 21800 kilocycles indicated is to be transferred to the set frequency box 230 set by operating the control knob 215. As a result, during the working period of the first monostable multivibrator of the frequency selector box 210, the number 1 gates of all of the groups of ten gates are capable of being opened.

The first gate of group $222_a$ conducts to transmit the exploratory saw-tooth waveform control voltage from the generator 222 of the general control box to the variable oscillator 232 of the set frequency box. This produces a variable output frequency which is fed through the gate $224_a$ to the modulator 224 which compares it with the chosen limit frequency admitted through the appropriate AND gate $223_a$. When coincidence occurs the first of the AND gates 225 has all three input terminals energised and transmits the output of the modulator 231 to the low frequency filter 226 and the amplifier 227 which changes the count stored in the counter 228 by one for each coincidence registered. When the counter 228 has received a number of pulses equal to the value initially stored in it (by means not shown) it generates a pulse which is transmitted through the first counting gate $228_a$ to the bistable multivibrator 235 of the set frequency box 230. This switches the bistable multivibrator 235 into its second state at which it applies the steady output of the phase discriminator 234 as a synchronization control voltage to the variable oscillator 232. The output of the set frequency box is now provided at the frequency of the variable oscillator 232 at which it has been synchronized.

I claim:

1. A frequency synthesizer for providing synchronized different output frequencies from respective set frequency units each of which is capable of being set by a general control unit to a desired frequency posted in a frequency selector unit; the frequency selector unit having controls to select a desired frequency and switching devices for choosing the set whose output frequency is to be synchronized with the desired frequency; the general control unit having circuitry providing a spectrum of highly stabilized frequencies with any of which the chosen set frequency unit may be synchronized, a generator providing an exploratory control voltage to a variable oscillator of the chosen set frequency unit when in exploratory control, a modulating and filtering member connected to compare the variable oscillator output frequency of the chosen set frequency unit with the frequency spectrum and providing output pulses for each coincidence of the oscillator output frequency with the spectrum frequencies lying above a predetermined threshold frequency, and a pulse counter adapted to be preset to a number indicative of the desired frequency of synchronization and to provide a switching signal to change the variable oscillator from exploratory control to synchronized control when the number of coincidence pulses received corresponds to said preset number; and each set frequency unit having in addition to the variable frequency oscillator a modulating and filtering circuit which modulates the variable oscillator output frequency with the frequency spectrum received from the general control unit to provide a first frequency, a phase discriminator comparing the first frequency with a second stabilized frequency received from the general control unit to provide a synchronizing control, and switching circuitry responsive to said switching signal from the counter of the general control unit to change the variable oscillator from exploratory control to synchronized control when its output frequency coincides with the desired frequency posted in the frequency selector unit.

2. A frequency synthesizer as set forth in claim 1, in which the frequency selector unit includes indicators to show synchronization of respective set frequency units.

3. A frequency synthesizer as set forth in claim 2, in which a voltage from the phase discriminator of the set frequency unit providing the synchronizing control of the variable frequency oscillator also exerts a control which illuminates a lamp in the frequency selector unit to show synchronization of the set frequency unit corresponding to the lamp.

4. A frequency synthesizer as set forth in claim 3, including a controller associated with the frequency selector unit and having a memory which retains informaion significant of the frequencies and destinations of espective set frequency units, and is operated by a signal rom any of the set frequency units which has lost synhronism to control the frequency selector unit to restore he set frequency unit to the desired stabilized frequency.

5. A frequency synthesizer as set forth in claim 4, n which the frequency selector unit includes monostable nultivibrators individually selectable to synchronize respective set frequency units with desired frequencies osted in succession in the frequency selector unit, the eneral control unit having groups of AND gates equal n number to the number of set frequency units associated vith the synthesizer, the variable oscillators of the set requency units being selectively connectible through one of the groups of AND gates to the exploratory control voltage generator by the monostable multivibrators.

References Cited

UNITED STATES PATENTS

| | | | |
|---|---|---|---|
| 3,277,389 | 10/1966 | Venn | 331—2 |
| 3,379,992 | 4/1968 | Hoo | 331—2 |

ROY LAKE, Primary Examiner

S. H. GRIMM, Assistant Examiner

U.S. Cl. X.R.

331—1, 4, 19, 25